United States Patent [19]

Fuse

[11] Patent Number: 5,404,554
[45] Date of Patent: Apr. 4, 1995

[54] INFORMATION PROCESSING SYSTEM WHICH CONVERTS SPECIFIC INSTRUCTION CODES TO NON-USER DEFINED INSTRUCTION CODES

[75] Inventor: Takeshi Fuse, Kawasaki, Japan

[73] Assignee: Fujitsu Limited, Kawasaki, Japan

[21] Appl. No.: 880,598

[22] Filed: May 8, 1992

[30] Foreign Application Priority Data

May 8, 1991 [JP] Japan .................... 3-102781

[51] Int. Cl.⁶ .............................................. G06F 9/00
[52] U.S. Cl. .................... 395/800; 395/375; 364/230.2; 364/232.8; 364/263.2; 364/DIG. 1
[58] Field of Search ............ 395/800, 775, 725, 575, 395/375

[56] References Cited

U.S. PATENT DOCUMENTS

| | | | |
|---|---|---|---|
| 4,498,136 | 2/1985 | Sproul, III | 395/725 |
| 4,616,331 | 10/1986 | Kinoshita et al. | 364/736 |
| 4,709,324 | 11/1987 | Kloker | 395/725 |
| 5,202,964 | 4/1993 | Crouch | 395/275 |
| 5,226,122 | 7/1993 | Thayer et al. | 395/275 |

FOREIGN PATENT DOCUMENTS 0374526  6/1990  European Pat. Off. .
2440030  5/1980  France .

OTHER PUBLICATIONS

*Patent Abstracts of Japan*, vol. 8, No. 48 (P-258), Mar. 3, 1984 & JP-A-58 199499 (Tokyo Shibaura Denki K.K.), Nov. 19, 1983.
*Patent Abstracts of Japan*, vol. 8, No. 215 (P-305), Oct. 2, 1984 & JP-A-59 099550 (Toshiba K.K.), Jun. 8, 1984.
*Patent Abstracts of Japan*, vol. 12, No. 88 (P-678), Mar. 23, 1988 & JP-A-62 221729 (Fujitsu Ltd), Sep. 29, 1987.

*Primary Examiner*—Alyssa H. Bowler
*Assistant Examiner*—Alpesh M. Shah
*Attorney, Agent, or Firm*—Staas & Halsey

[57] ABSTRACT

A processor comprises an instruction register which holds a plurality of user instruction codes one by one, a state counter which outputs a number indicating the internal state of a system which changes along with the execution of instructions, and a decoder which receives as input the contents of the instruction register and the state counter and produces various types of control signals for the system. Additionally, the processor has two further comprises a detection/storage unit which detects the occurrence of predetermined specific processing and when detecting the same stores the specific instruction code preselected from among the above-mentioned user instruction codes in the instruction register. Further, a state changing unit is included in the processor which, when there is a detection, presets the internal state number shown by the state counter to a certain value by force and which converts the instruction corresponding to the specific instruction code to an instruction compatible with the above-mentioned specific processing.

14 Claims, 12 Drawing Sheets

| | (A) PRESENT STATE | (C) FIELD OF CONTROL SIGNALS | (B) FIELD FOR SPECIFYING NEXT STATE | CYCLE [No.] |
|---|---|---|---|---|
| USUAL INSTRUCTIONS { INSTRUCTION P | 0 | P-1 | 1 | 1 |
| | 1 | P-2 | 2 | 2 |
| | 2 | P-3 | 15 | 3 |
| | 15 | P-4 [1R] | 0 | 4 |
| INSTRUCTION Q | 0 | Q-1 | 3 | 1 |
| | 3 | Q-2 | 8 | 2 |
| | 8 | Q-3 | 13 | 3 |
| | 13 | Q-4 | 14 | 4 |
| | 14 | Q-5 | 15 | 5 |
| | 15 | Q-6 | 0 | 6 |
| NOP (INT) INSTRUCTION { NOP ENTRY → | 0 | NOP-1 | 15 | 1 |
| INT ENTRY → | 8 | INT-1 | 9 | 1' |
| | 9 | INT-2 | 10 | 2' |
| | 10 | INT-3 | 11 | 3' |
| | 11 | INT-4 | 14 | 4' |
| | 14 | INT-5 | 15 | 5' |
| | 15 | NOP-2, INT-6 | 0 | 2, 6' |
| JMP (RST) INSTRUCTION { JMP INTRY → | 0 | JMP-1 | 1 | 1 |
| | 1 | JMP-2 | 2 | 2 |
| | 2 | JMP-3 | 15 | 3 |
| RST ENTRY → | 8 | RST-1 | 9 | 1' |
| | 9 | RST-2 | 12 | 2' |
| | 12 | RST-3 | 13 | 3' |
| | 13 | RST-4 | 14 | 4' |
| | 14 | RST-5 | 15 | 5' |
| | 15 | JMP-4, RST-6 | 0 | 4, 6' |

INFORMATION PROCESSING SYSTEM WHICH CONVERTS SPECIFIC INSTRUCTION CODES TO NON-USER DEFINED INSTRUCTION CODES

BACKGROUND OF THE INVENTION

1. Field of the Invention

The present invention relates to an information processing system including, for example, a technique for generation of instructions in an information processing system such as a microprocessor or microcontroller.

In recent years, numerous information processing systems such as CPU's (central processing units) and MPU's (microprocessing units) have been developed.

In a microcomputer housing, for example, a microprocessor or microcontroller as an information processing system, it is desired that the costs be reduced and the reliability of the product be improved moreover the maximum performance is desired to be realized with limited hardware.

2. Description of the Related Art

As will be explained later with reference to the drawings, in the conventional information processing system, when allocating a code for specific processing, for example, interrupt processing and reset processing, the practice had been to allocate unique codes to avoid overlap with user instructions. For example, two codes would be used, which could not be used by the user on an instruction map; therefore, the following problems occurred.

In normal design work, the absolute number of the instructions, which can be used by the user, is reduced by the number of instructions for the specific processing mentioned above (interrupt processing and reset processing), for example, two instructions. Therefore the efficiency of utilization of the instruction map at the user side was deteriorated.

Further, when the users differed and the codes allocated to these specific processing operations (interrupt processing and reset processing) were used, it was impossible to guarantee the operations and consequently, the possibilities of unforeseen faults increased.

SUMMARY OF THE INVENTION

Therefore, the present invention has as its object to raise the efficiency of utilization of the instruction map and to provide a highly reliable information processing system.

To attain the above object, the system of the present invention is basically provided with:

an instruction register for sequentially holding a plurality of user instruction; a state counter for outputting an internal state number of the system, which changes during the execution of an instruction corresponding to the above held user instruction code; and a decoder for generating a variety of control signals for different portions of the system based on the content of the above-mentioned instruction register and the content of the state counter.

Further, the system of the present invention may be provided with a detection/storage unit for detecting when a predetermined specific processing operation must be executed in the system and for storing a specific instruction code preselected from the plurality of user instruction codes in the above-mentioned instruction register and a state changing unit for cooperating with the above-mentioned state counter and changing the above-mentioned internal state number of the state counter when the above-mentioned detection and storage are performed so as to convert the specific instruction code to another instruction code which cannot be defined by the user instruction codes.

BRIEF DESCRIPTION OF THE DRAWINGS

The above object and features of the present invention will be more apparent from the following description of the preferred embodiments with reference to the accompanying drawings, wherein:

FIG. 11 is a view of an example of a decoder map;

DESCRIPTION OF THE PREFERRED EMBODIMENTS

Before describing the embodiments of the present invention, the prior art and problems therein will be first described with reference to the related figures.

Figure 1:
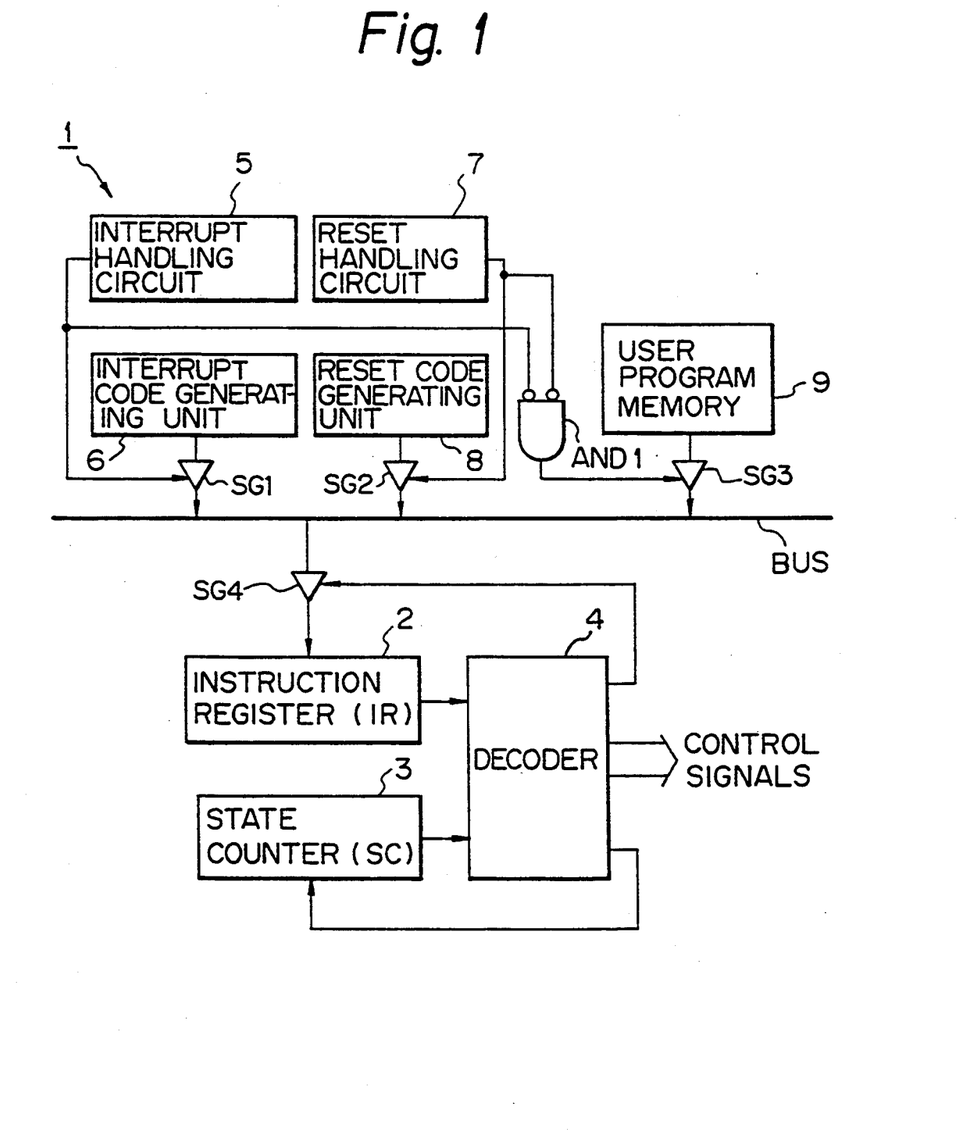
FIG. 1 is a block diagram of a conventional information processing system showing only the portions related to the present invention.

FIG. 1 is a block diagram of a conventional information processing system showing only the portions related to the present invention. The figure shows a microprocessor as an example of a frequently used information processing system. The microprocessor 1 shows the case of interrupt processing and reset processing as examples of the afore-mentioned predetermined specific processing.

The microprocessor 1 is comprised, in general, of an instruction register (IR) 2, a state counter (SC) 3, a decoder 4, an interrupt handling circuit 5, an interrupt code setting or generating unit 6, a reset handling circuit 7, a reset code setting or generating unit 8, and a user program memory 9.

Note that SG1 to SG4 are buffers and AND1 is an AND gate. The instruction register 2 temporarily stores instruction codes fetched from the memory 9 for input into the control circuit (in this case the decoder 4) of a microprocessor. The state counter 3 shows the state of the inside of the system in accordance with the instruction code during the time when the processing is being executed on the instruction code.

The decoder 4 generates various control signals based on the values of the instruction register 2 and the state counter 3.

The mode of operation will not be explained.

There are mainly three types of CPU control operations: execution of instructions, interruption processing, and reset processing.

Normally, during execution of a user instruction, a decoder 4 comprised of a programmable logic array (PLA) etc. is used to decode the content of instruction code held in the instruction register 2 during the execution of the user instruction and the state counter (internal state counter) 3, indicating showing what step of the instructions is being executed, and to generate the above-mentioned various types of control signals.

Several methods exist for the sequential control in interruption handling and reset handling—the predetermined specific processing operations. For example, one of these, is the method of allocating instruction codes to the interrupt processing and the reset processing.

In this method, upon detecting an interrupt request or a reset, the corresponding instruction code is supplied by code generating unit 6 or 8, respectively, and stored in the instruction register 2 in the system. The already existing decoder 4 is used for control of the interrupt processing or the reset processing. In this case, the fetch operation of the next instruction code is temporarily stopped by closing the switching gate SG3 by the AND gate 1 AND1.

Specifically, in the case of allocating a code for the interrupt processing or the reset processing, to avoid overlap with the user instruction (general instruction), use has been made of a unique code for the codes showing the interrupt processing and the reset processing. As a result, the previously mentioned two problems arose.

Figure 2:
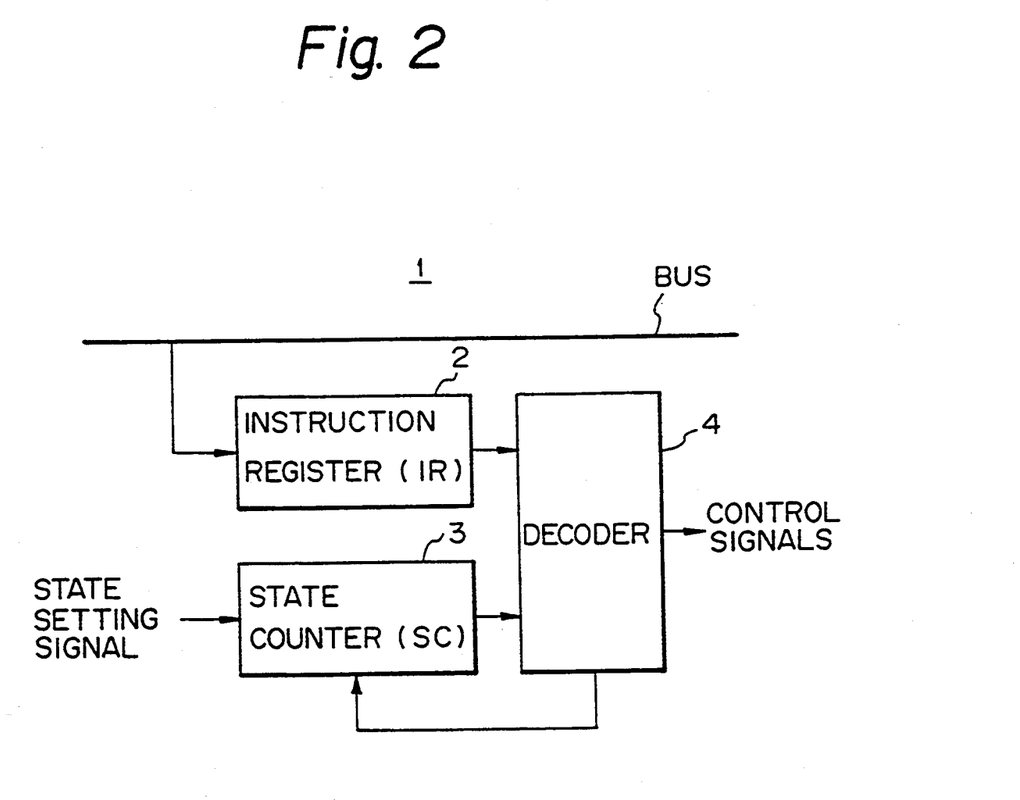
FIG. 2 is a general constitutional view of the information processing system according to the present invention.

FIG. 2 is a general constitutional view of the information processing system according to the present invention. The state counter 3 is constituted so as to allocate a plurality of operational instructions for the same instruction code by selectively giving any value out of values showing a plurality of states for a specific instruction code.

Figure 3:
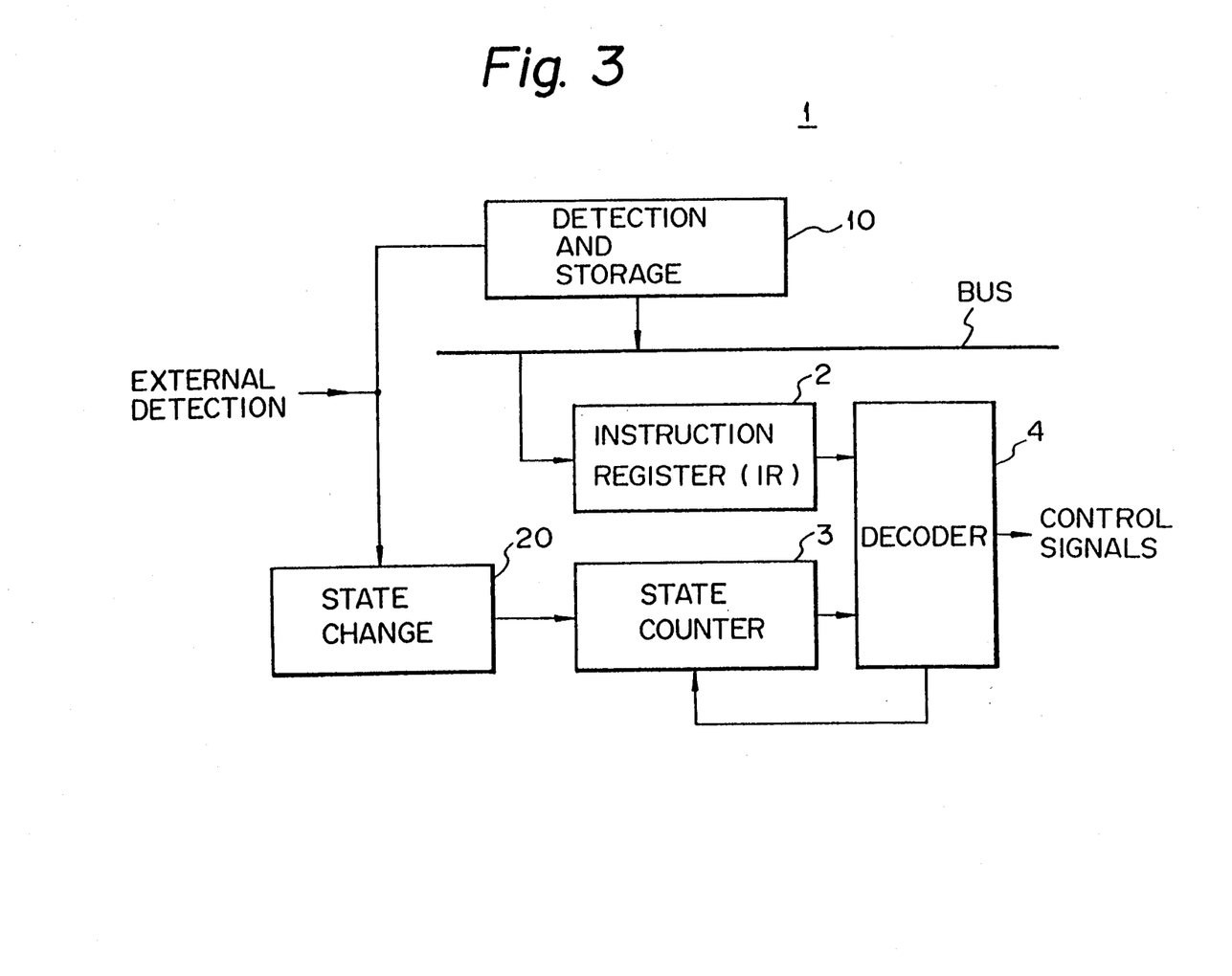
FIG. 3 is a basic constitutional view of the information processing system according to the present invention.

FIG. 3 is a basic constitutional view of the information processing system according to the present invention. The information processing system according to the present invention provides an information processing system. The information processing system has an instruction register 2, which sequentially receives a plurality of user instruction codes and stores and holds the user instruction codes while processing of instructions corresponding to the received user instruction codes are is being executed.

A state counter 3 outputs a number showing the internal state of the system. The number changes in accordance with the incrementing of steps of the processing due to execution of processing of instructions corresponding to the user instruction codes stored and held in the above-mentioned instruction register 2.

a decoder 4 receives, as input, the user instruction codes stored and held in the above-mentioned instruction register 2 and the internal state number, indicated by the state counter 3. The decoder generates various types of control signals for different portions in the system based on these received values. The crux of the present invention lies in the inclusion of the further following two constituent elements in the system.

First, a detection/storage unit 10 detects when a predetermined specific processing operation must be executed in the system and stores a specific instruction code preselected from the plurality of user instruction codes in the instruction register. Secondly, a state changing means 20 cooperates with the state counter 3 and changes the internal state number of the state counter 3, when the detection and storage is performed. This converts the specific instruction code to another instruction code which cannot be defined by the user instruction codes.

The state changing means 20 is activated when there is a detection by the above-mentioned detection/storage unit 10.

Alternatively, the occurrence of the predetermined specific processing is detected outside of the system and the detection signal is used to activate the state changing means 20. (See "External Detection" in FIG. 3.)

Figure 4:
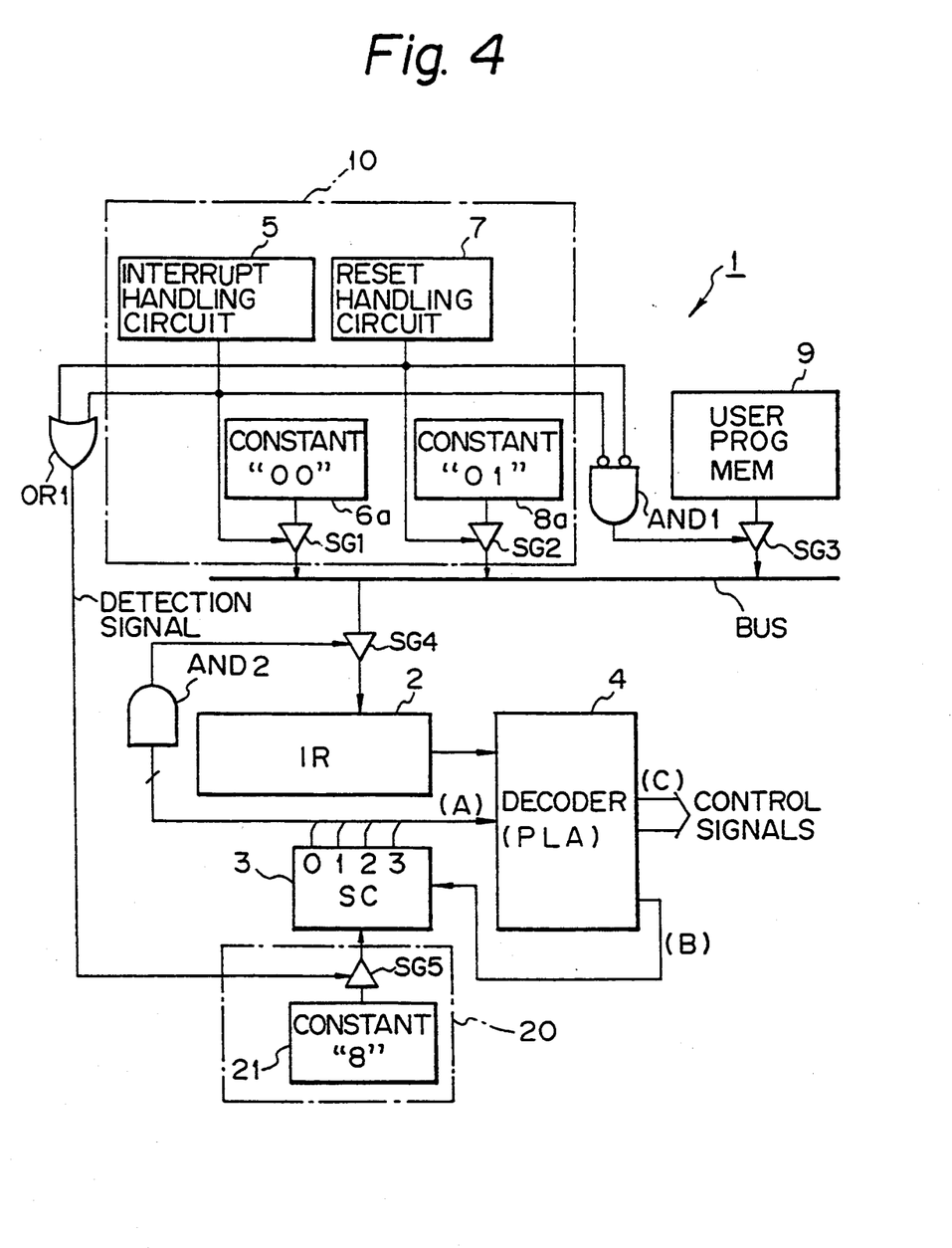
FIG. 4 is a circuit diagram showing an embodiment based on the present invention.

FIG. 4 is a circuit diagram showing an embodiment based on the present invention. Note that in this embodiment, use is made of interrupt processing and reset processing as examples of the predetermined specific processing. Throughout the figures, note, the same constituent elements are shown with the same reference numerals or symbols.

The microprocessor 1, i.e., the information processing system of the present embodiment, is comprised generally of an instruction register (IR) 2, a state counter (SC) 3, a decoder (PLA) 4, parts of the detection/storage unit 10, i.e., the interrupt handling circuit 5 and the interrupt constant setting unit 6a, other parts of the reset handling circuit 7 and the reset constant setting unit 8a, the user program memory 9, and the constant setting unit 21 forming the state changing unit 20.

Note that OR1 and AND2 are OR gate and AND1 is an AND gates.

The state counter 3 in the present embodiment is comprised of 4 bits (0, 1, 2, 3).

The interrupt constant setting unit 6a and the reset constant setting unit 8a have set for them, for example, instruction codes of the logic "00" and "01". The meaning of these codes in terms of the user instructions are, for example, a "NO OPERATION" instruction (NOP) and "JUMP" instruction (JMP).

The detection/storage means 10 detects an interrupt request as the specific processing, by that detection, stops once the transfer of the next code instruction code to the instruction register 2 (closes the switching gate SG3), and stores the specific instruction code (NOP) preallocated to the interrupt processing in the instruction register through the open switching gate SG1.

The state changing unit 20 is set so that the internal state shown by the state counter 3 complies with the interrupt processing state.

The detection/storage unit 10 detects a reset input as the specific processing, by that detection, stops once the transfer of the next user instruction code to the instruction register 2 (closes the switching gate SG3), and stores the specific instruction code (JMP) preallocated to the reset processing in the instruction register through the open switching gate SG1.

The state changing unit 20 is set so that the internal state shown by the state counter 3 complies with the reset processing state.

The state counter 3 increments the internal state number from 0 for the user instruction codes, while the state changing unit 20 controls the state counter so as to increment from a predetermined internal state number of 0 on, for example, 8.

The mode of operation will now be explained.

The table shows the sequence (flow of operation of state counter 3) in the respective instructions (processing).

In this embodiment, all the instructions are designed so as to end with the state "15" (however, the operation at the state "15" is made common for all instructions and is a fetch operation for the next instruction code). The jump in the flow by the state counter 3 (jump from state "00" to "15" by NOP instruction etc.) is performed by the control of the decoder 4.

TABLE

| | | |
|---|---|---|
| State counter at time of "NOP" | "00" ↓ "15" | Instruction register Code "00" |
| State counter at time of interrupt processing | "8" ↓ "9" ↓ "10" ↓ "15" | Code "00" |
| State counter at time of "JMP" | "00" ↓ "1" ↓ "2" ↓ "15" | Instruction register Code "01" |
| State counter at time of reset processing | "8" ↓ "9" ↓ "10" ↓ "11" ↓ "12" ↓ "15" | Code "01" |

[Case of Interruption Processing]

First, when an interrupt is generated from the CPU right in the middle of execution of a user instruction, the interrupt constant setting unit 6a sets by force "00" in the instruction register 2 and the constant setting unit 21 sets "8" in the state counter 3. The predetermined interrupt processing is executed by the decoder 4 through the states "9", "10", and "15".

Here, the instruction code "00" means NOP in the user instructions, but in a case other than interrupt processing, the state counter 3 is not set by the constant setting unit 21. The state in this case starts from "0" and jumps directly to the state "15" without going through the state "8". Therefore, there is no confusion in the operation in these two types of processing and the NOP processing and interrupt processing are performed independently distinguished from each other.

[Case of Reset Processing]

Similarly, when a reset input is received from the CPU, the reset constant setting unit 8a sets by force "01" in the instruction register 2, and the constant setting unit 10 sets "8" in the state counter 3. The predetermined reset processing is executed by the decoder 4 through the states "9", "10", "11", "12" and "15".

Here too, the instruction code "01" coincides with a JUMP instruction in the user instructions, but in a case other than reset processing, the state counter 3 is not set by the constant setting unit 10. The state in this case starts from "0" and jumps to the state "15" without going through the states "1" and "2" to "8". Therefore, there is no confusion in operation in two types of processing and the JUMP processing and reset processing are performed independently distinguished from each other.

Therefore, while the JUMP processing and the reset processing overlap in the instruction codes, there is no confusion in the operation and the instructions are handled separately from the user instructions.

In this way, in the present embodiment, since unique codes are not used for the interrupt processing and the reset processing, it is possible to increase the absolute number of instructions compared with in the prior art example.

Therefore, it is possible to obtain the maximum performance in the limited hardware resources, and instruction codes which would be inconvenient for the user to use no longer exist, so it is possible to prevent, in advance, faults during actual usage by the user and it is possible to raise the reliability.

Note that the above-mentioned embodiment was explained assuming the state counter 3 was a 4 bit type, the codes of the interrupt processing and the reset processing were respectively "00" and "01", and the user instructions overlapping with these codes were NOP and JMP instructions, but the invention is not limited to these. It is possible to use any combination of the number of bits of the state counter 3, the code of the interrupt processing, the code of the reset processing, and the instruction codes overlapping with these.

Figure 5:
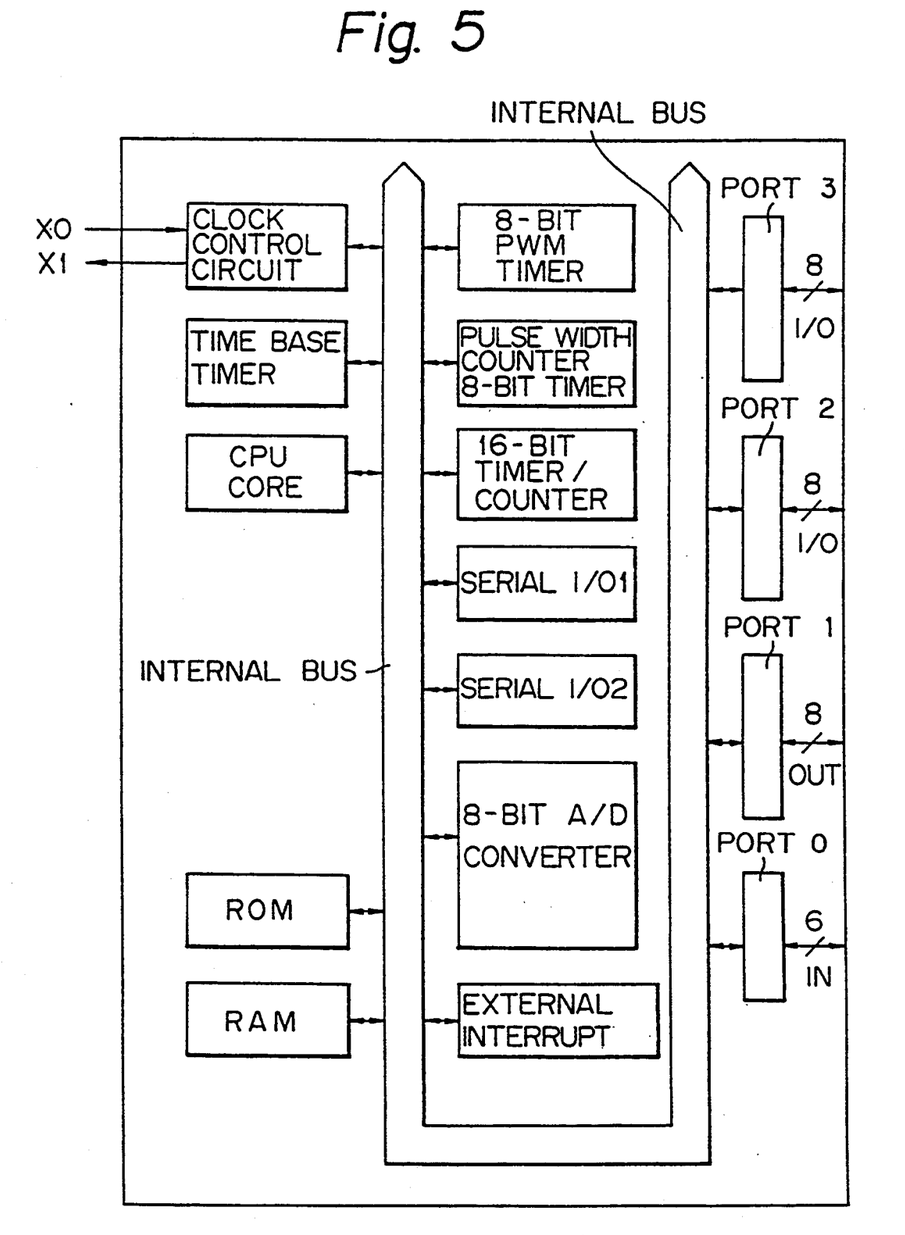
FIG. 5 is a block diagram of a known example of the overall information processing system to which the present invention is applied.

FIG. 5 is a block diagram of a known example of the overall information processing system to which the present invention is applied. Note that the layout of the figure shows a one-chip microcomputer. The present invention is particularly applied to the inside of the CPU core (top left in the figure).

Figure 6:
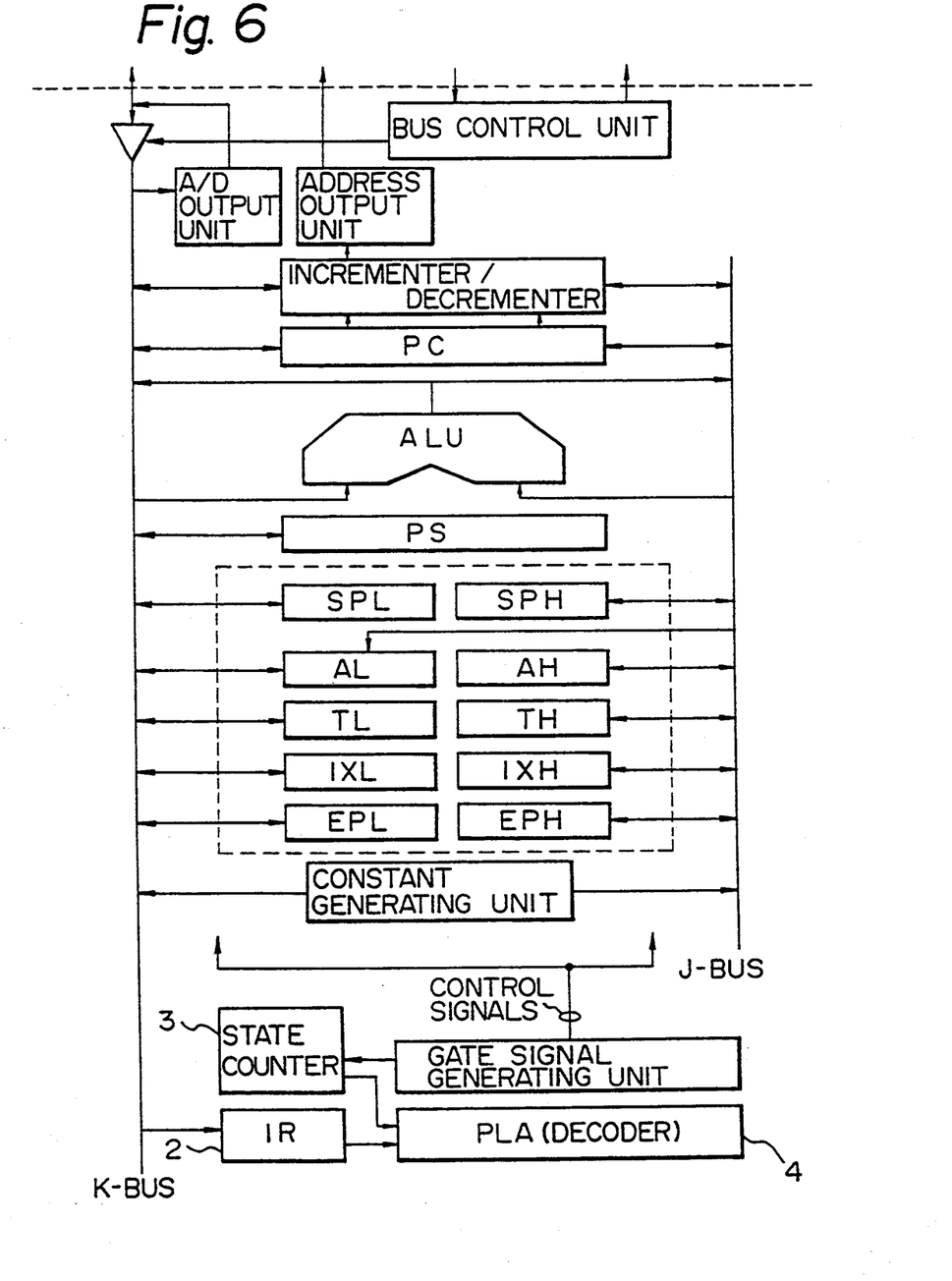
FIG. 6 is a view showing a detailed example of a CPU core FIG. 5.
Figure 7:
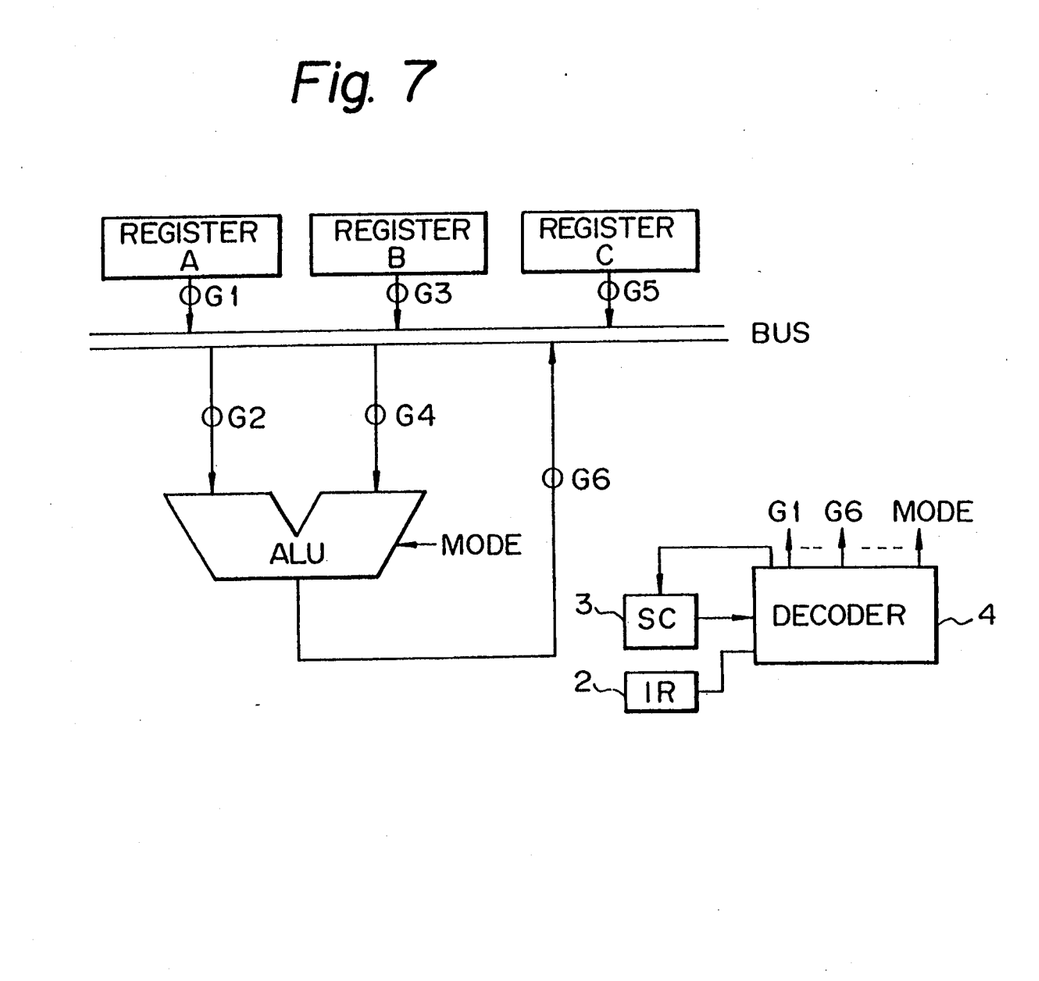
FIG. 7 is a constitutional view for explaining the functions of a decoder.

FIG. 6 is a view showing a detailed example of a CPU core in FIG. 5. The three blocks shown at the bottom of the figure correspond to the members 2, 3, and 4 already mentioned. Note that in the figures, the abbreviations mean the following, starting from the top of the figure:

PC: Program counter
ALU: Arithmetic and logic unit
PS: Program status
"H": High
"L": Low (both "H" and "L" are used in combination with the following abbreviations)
SP: Stack pointer
A: Accumulator
IX: Index
EP: Extended pointer FIG. 7 is a constitutional view for explaining the functions of a decoder. The decoder 4 and the instruction register (IR) 2 and the state counter (SC) 3 cooperating with the same are as explained previously. The ALU is shown in FIG. 6. The register A, register B, and register C transfer data with the ALU through the buses.

The output of the decoder 4 (various types of control signals) is partially applied to the gates G1 and G2 to G6. The opening and closing of these gates are controlled individually. The decoder 4 also outputs a mode signal and designates the operational mode (addition, subtraction, etc) of the ALU.

Figure 8:
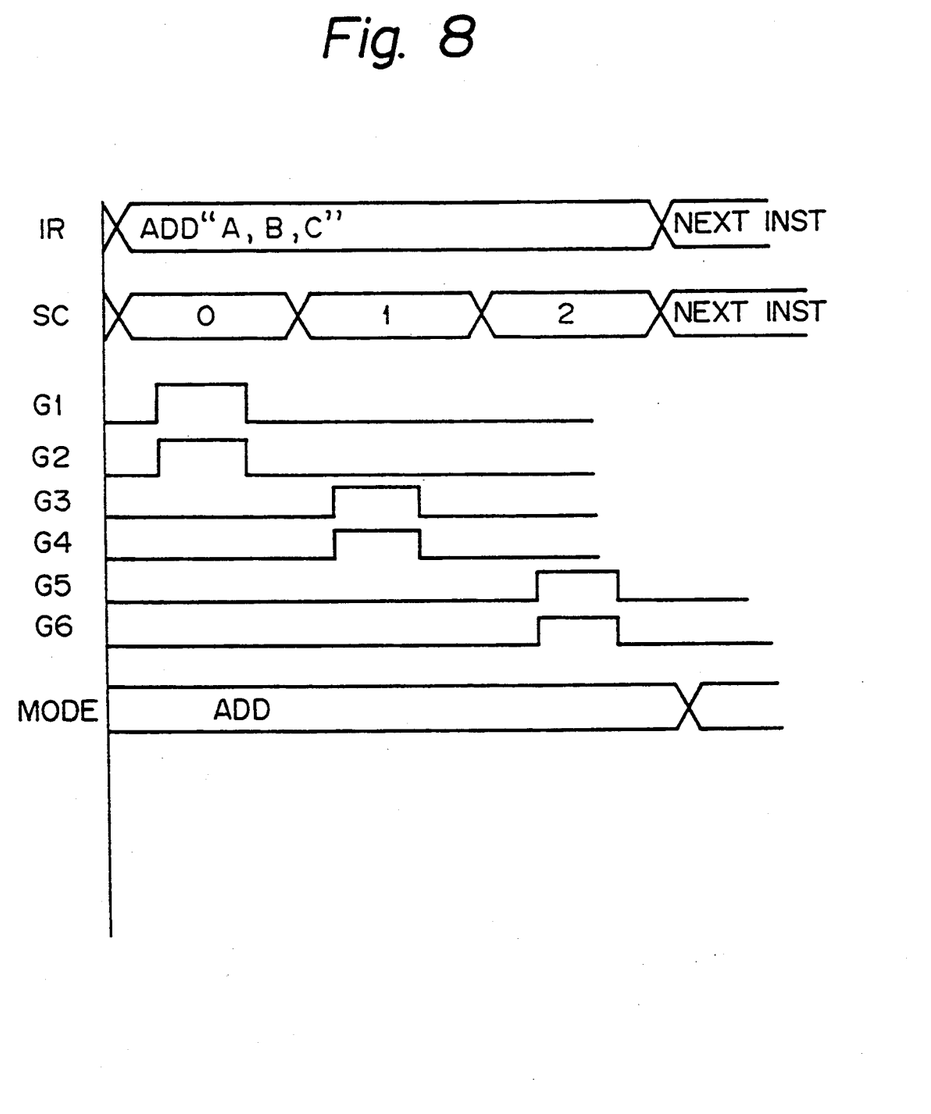
FIG. 8 is a time chart for explaining the operation of the circuit shown in FIG. 7.

FIG. 8 is a time chart for explaining the operation of the circuit shown in FIG. 7. The IR, SC, G1 to G6, and MODE of the rows of the figure indicate portions corresponding to FIG. 7. According to the example of this figure, an ADD instruction is executed, data of the registers A and B are added, and the results are stored in the register C.

In the first cycle, the gates G1 and G2 are opened and the data (A) is given to one input of the ALU.

In the second cycle, the gates G3 and G4 are opened and the data (B) is given to the other input of the ALU.

In the third cycle, the gates G5 and G6 are opened and the results of the addition of the ALU are transferred to the register C.

Figure 9:
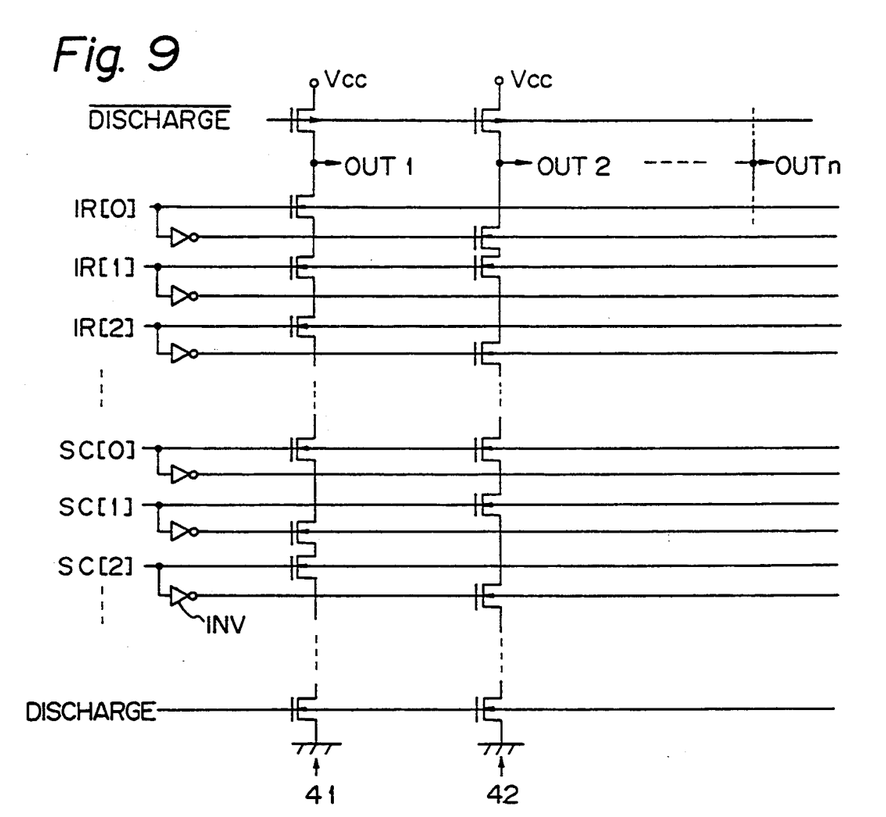
FIG. 9 is a view showing a specific example of a decoder.

FIG. 9 is a view showing a specific example of a decoder. As illustrated, it is comprised of a programmable logic array (PLA). IR[0], IR[1]. . . indicate the outputs of the bits (first bit, second bit, etc.) of the instruction register 2, while SC[0], SC[1]. . . indicate the outputs of the bits (first bit, second bit. . .) of the state counter (SC) 3.

Figure 10:
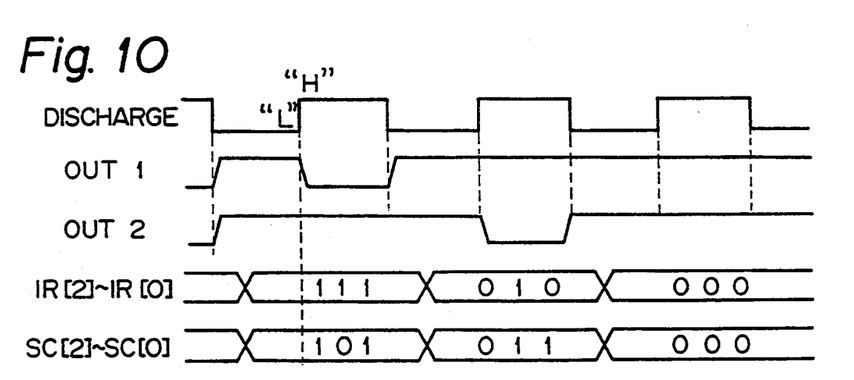
FIG. 10 a time chart for explaining the operation of the decoder shown in FIG. 9.

FIG. 10 is a time chart for explaining the operation of the decoder shown in FIG. 9. Referring to FIG. 9 and FIG. 10, the topmost transistor (P-channel MOSFET) in the group of transistors in the column 41 of FIG. 9 is first turned ON by the "L" level ("L" in FIG. 10) of the discharge signal and charges the output OUT1 to $V_{CC}$. After this, when the discharge signal becomes the "H" level ("H" in FIG. 10), the bottommost transistor (N-channel MOSFET) in the group of transistors in column 41 is turned ON.

Here, the transistors corresponding to the IR[0] to IR[2] (only three bits covered for simplification, same below) in column 41 are all turned ON when IR[0] to IR[2] are "111". Further, the transistors corresponding to SC[0] to SC[2] are all turned ON when SC[0] to SC[2] are "101". The output OUT1 therefore becomes the "L" level as shown in FIG. 10. The transistor corresponding to SC[1] has a gate which is connected to the SC[1] bit through an invertor (INV), so when SC[1] is 0, the transistor becomes ON. Note that the output of OUT1 becomes one of the control signals mentioned earlier when it is inverted in level.

The exact same thing applies to the group of transistors in column 42. When IR[0] to IR[2] are "010" and SC[0] to SC[2] are "110", the output "L" appears at the OUT2.

FIG. 11 is a view of an example of a decoder map and corresponds to the above-mentioned table. The map of the figure is shown in more detail. In FIG. 11, (A), (C), and (B) are information expressed by the signals appearing at (A), (C), and (B) in FIG. 4 and are information on the present state, a field of control signals, and a field for specifying the next state.

The P and Q mentioned above are usual instructions, P consisting of four instruction cycles and Q of six instruction cycles. Note that "R" in the figure indicates fetching of the next instruction.

Regarding the instruction P, in the cycle No. 1, it is designated that the next state is 1 and at the state after that the state equals 2 (P-2). At P-3, it is designated that the next state equals 15. At the cycle No. 4, the state becomes 15. The next state shown at cycle No. 4 is 0. The present state 0 of the instruction Q is started. The same is repeated after this.

In the embodiment of the present invention, the usual NOP instruction is also used as an INT (interrupt) instruction. When the usual NOP instruction is entered, the execution of the instruction is completed in two cycles (No. 1 and No. 2) of NOP-1 and NOP-2.

However, if an interrupt instruction (INT) is entered, the state counter 3 is preset to a certain value (8) according to the present invention and the steps INT-1 . . . INT-6 are executed along the cycles No. 1'. . . No. 6'.

Further, if a usual JMP (JUMP) instruction is entered, JMP-1. . . JMP-4 are executed over four cycles (No. 1 . . . No. 4).

However, if the reset instruction (RST) is entered, the state counter 3 is preset to a certain value (8) according to the present invention and the steps RST-1 . . . RST-6 are executed over the six cycles (No. 1'. . . No. 6').

Basically, the state changing means 20 operates so as to increment from an internal state number which does not overlap with the internal state number which the above-mentioned specific instruction code (NOP, JMP) uses.

Further, the state changing means 20 operates so that the final internal state number which said specific instruction code (NOP, JMP) uses and the final internal state number which the other instruction code (INT, RST) converted from said specific code uses are made to match.

In this way, the design of the decoder 4 is simplified and the hardware also becomes simpler.

Therefore, it is advantageous if the specific instruction code is selected from among user instruction codes with small numbers of internal states among the said plurality of user instruction codes.

Figure 12:
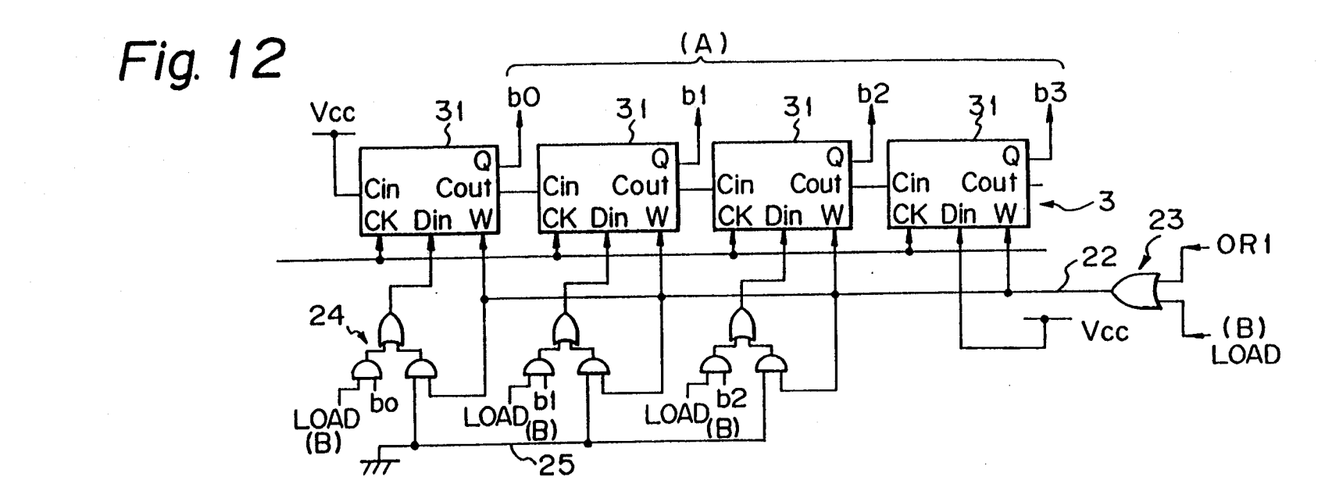
FIG. 12 is a view of a specific example of a state counter and state changing means.

FIG. 12 is a view of a specific example of a state counter and state modifying means.

In FIG. 12, the state counter 3 and state changing means 20 are basically comprised of a plurality of counter cells 31, OR gates 23, and multiplexers 24 connected in cascade by carry-in terminals Cin and carry-out terminals Cout.

The output terminals Q of the counter cells are connected to the input of the decoder 4 (refer to (A) in FIG. 4).

The write terminals W of the counter cells 31 are connected to the outputs of the OR gates receiving as two inputs the load signal from the decoder 4 and the detection signal (output from OR1 in FIG. 4) from the detection/storage means 10.

The data terminals Din of the counter cells 31 are connected in BIT correspondence with the output of the multiplexers 24 which selectively output the load data BITS (b0, b1, b2, b3) output together with the load signal from the decoder and BITS (ground line 25 resulting in all "0" given) showing the predetermined internal state number after 0 output together with the detection signal.

Figure 13:
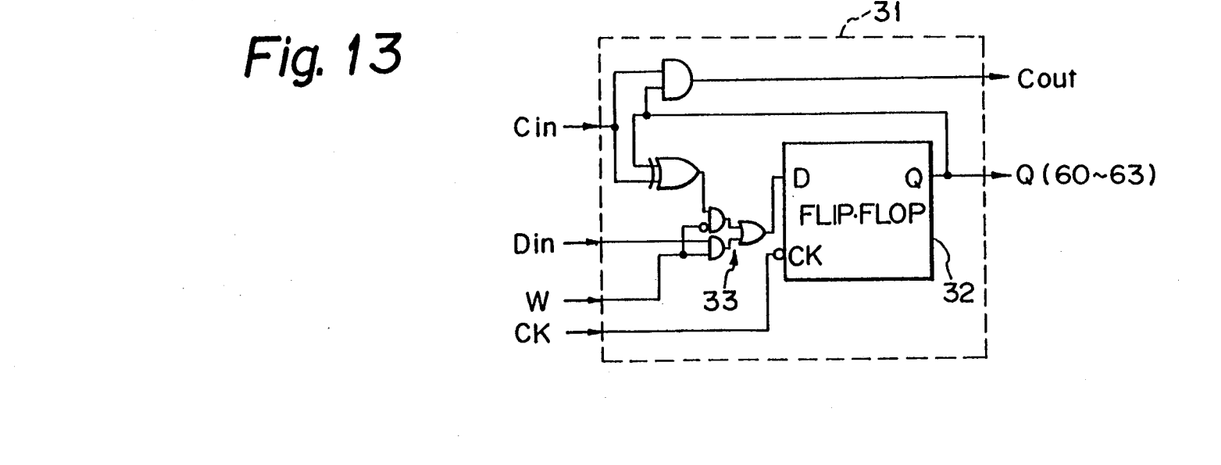
FIG. 13 is a view showing the inside of a counter cell shown in FIG. 12.

FIG. 13 is a view showing the inside of a counter cell shown in FIG. 12.

The counter cells 31 incorporate D-flip-flops 32.

Further, they incorporate other multiplexers 33 which selectively apply the signal from the carry-in terminal or the signal from the carry-out signal to the data input terminal D of the D-flip-flop 32.

When a usual instruction is executed, the multiplexers 33 select the input signal of the Cin side, and the state counter 3 counts up from 0.

On the other hand, when the processing produced under the present invention (interrupt and/or reset) is executed, the input signal on the Din side is selected. At this time, the input data (Din of the four count cells 31 becomes "1000". The outputs 60 to 63 in FIG. 12 indicate "8" (see "8" in FIG. 4).

Figure 14:
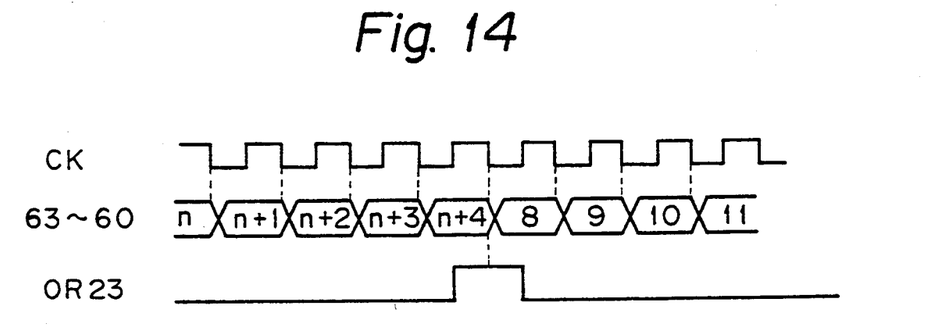
FIG. 14 is a time chart for explaining the operation of the counter cells of FIG. 12.

FIG. 14 is a time chart for explaining the operation of the counter cells of FIG. 12. In the figure, CK is a clock input and is shown in FIG. 12 and FIG. 13 as well. Reference numerals 60 to 63 are outputs of the counter cells 31 shown in FIG. 12. OR23 indicates the output from the OR23 in FIG. 12. When there is no output from the OR23, the output (60 to 63) of the state counter (31) is counted up, i.e., n→n+1→n+2... with each fall of the clocks CK.

However, if an output is generated from the OR23, the output (60 to 63) of the state counter (31) is preset by force to "8", then is counted up, i.e., 8→9→10... with each fall of the clocks CK.

Figure 15:
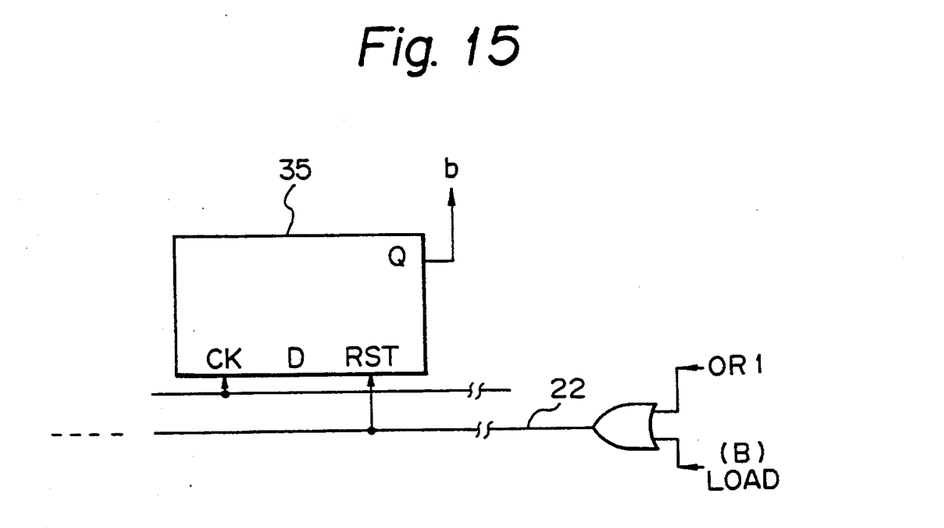
FIG. 15 is a view showing another example of a circuit performing an equivalent function as the circuit function shown in FIG. 12.

FIG. 15 is a view showing another example of a circuit performing an equivalent function as the circuit function shown in FIG. 12. According to this construction, functions corresponding to each pair of a counter cell 31 and a multiplexer 24 are realized by the counter cells 35 for the asynchronous forced reset input terminals RST, and BITS ("8") showing the predetermined internal state number after 0 is preset in BIT (D) correspondence in the counter cells 35. According to this construction, the multiplexers 24 of FIG. 12 become unnecessary.

In the present invention, it is possible to allocate a plurality of operational instructions to the same instruction code by giving to the state counter 3 a value indicating interrupt processing and/or reset processing for a specific instruction code (NOP, JMP) based on a state setting signal input from the outside.

Therefore, it is possible to realize independent operations without setting unique codes for the interrupt processing and the reset processing.

I claim:

1. An information processing system comprising:
    an instruction register which sequentially receives a plurality of user instruction codes and stores and holds the plurality of user instruction codes while processing of instructions corresponding to the plurality of user instruction codes received is being executed;
    a state counter which outputs a number indicative of an internal state of the system, which changes in accordance with an incrementation of steps of the processing of said user instruction codes during an execution of processing of the instructions corresponding to the user instruction codes stored and held in said instruction register;
    a decoder which receives, as input, the plurality of user instruction codes stored and held in said instruction register and the internal state number from said state counter and generates various types of control signals for different portions in the system based on said received user instructions codes and the internal state number;
    a detection/storage means which detects when a predetermined specific processing operation must be executed in the system and stores a specific one of the plurality of user instruction codes preselected from the plurality of user instruction codes in said instruction register; and
    a state changing means which cooperates with said state counter and changes the internal state number of the state counter when the detection and storage are performed by said detection/storage means so as to convert the specific one of the user instruction codes to a non-user defined instruction code which cannot be defined by the plurality of the user instruction codes.

2. An information processing system as set forth in claim 1, wherein
    said state counter increments said internal state number from 0 for the user instruction codes, while the state changing means controls the state counter so as to increment from a predetermined internal state number of 0 on.

3. An information processing system as set forth in claim 2, wherein said state changing means operates so as to increment from the internal state number which does not overlap with the internal state number which the above-mentioned specific instruction code uses.

4. An information processing system as set forth in claim 3, wherein said state changing means operates so that final internal state number which said specific instruction code uses and final internal state number which the non-user defined instruction code, converted from said specific one of the user instruction codes, uses are made to match.

5. An information processing system as set forth in claim 1, wherein said specific instruction code is selected from among the plurality of user instruction codes with small numbers of internal states among the plurality of user instruction codes.

6. An information processing system as set forth in claim 1, wherein said state changing means is activated when a detection by said detection/storage means occurs.

7. An information processing system as set forth in claim 1, wherein an occurrence of said predetermined specific processing is detected outside of said information processing system and a detection signal is used to activate said state changing means.

8. An information processing system as set forth in claim 1, wherein:
    said detection/storage means detects an interrupt request indicating that an interrupt processing is requested as said specific processing, and, in response, stops once a transfer of the next user instruction code to said instruction register, and stores the specific one of the user instruction codes preallocated to the interrupt processing in said instruction register and
    said state changing means is set so that the internal state shown by said state counter complies with said interrupt processing state.

9. A system as set forth in claim 8, wherein said specific instruction code is a "jump" instruction.

10. An information processing system as set forth in claim 1, wherein:
    said detection/storage means detects a reset input indicating that a reset processing is requested as said specific processing, and, in response, stops once a transfer of the next user instruction code to said instruction register, and stores the specific one of the user instruction codes preallocated to the reset processing in said instruction register and
    said state changing means is set so that the internal state shown by said state counter complies with said reset processing state.

11. An information processing system as set forth in claim 10, wherein said specific one of the user instruction codes is a "no operation" (NOP) instruction.

12. An information processing system as set forth in claim 2, wherein:
said state counter and said state changing means are comprised of a plurality of counter cells, OR gates, and multiplexers connected in cascade by carry-in (Cin) terminals and carry-out (Cout) terminals, each of said multiplexers having an input and an output;
output (Q) terminals of the said counter cells are connected as an input to said decoder;
write terminals of said counter cells receive outputs of said OR gates, each of said OR gates receiving a load signal from said decoder and a detection signal from said detection/storage means; and
data terminals of said counter cells are connected in BIT correspondence with the output of the said multiplexers which selectively output load data BITS together with the load signal from the said decoder, BITS showing a predetermined internal state number after 0, and said detection signal.

13. An information processing system as set forth in claim 12, wherein said counter cells incorporate D-flip-flops and a second plurality of multiplexers, which selectively apply signal from said carry-in terminal or a signal from said carry-out terminal to data input terminals of the D-flip-flops.

14. An information processing system as set forth in claim 13, wherein:
functions corresponding to pairs of said counter cells and one of said second plurality of multiplexers are realized by the counter cells for asynchronous forced reset input terminals, and BITS showing the predetermined internal state number after 0 are preset in BIT correspondence in said counter cells.

* * * * *

UNITED STATES PATENT AND TRADEMARK OFFICE
CERTIFICATE OF CORRECTION

PATENT NO. : 5,404,554
DATED : April 4, 1995
INVENTOR(S) : Takeshi FUSE

It is certified that error appears in the above-indentified patent and that said Letters Patent is hereby corrected as shown below:

Title Page, [57], line 9, delete "two";
    Line 10, delete "has".

Col. 1, line 18, delete "more over the" and insert therefor
    --. Moreover,--;
    Line 35, after "Therefore", insert a comma (",").

Col. 3, line 9, delete "not" and insert therefor --now--;
    Line 64, delete "a" and insert therefor --A--;
    Line 67, after "decoder", insert --4--.

Col. 4, line 39, delete "and AND2 are" and insert therefor
    --is an--;
    Lines 39 and 40, delete "is an" and insert therefor --and
        AND2 are--.

Col. 10, line 24, after "and", insert --a--.

Signed and Sealed this

Sixth Day of June, 1995

Attest:

BRUCE LEHMAN

Attesting Officer      Commissioner of Patents and Trademarks